United States Patent [19]
Pope et al.

[11] Patent Number: 5,169,159
[45] Date of Patent: Dec. 8, 1992

[54] EFFECTIVE SEALING DEVICE FOR ENGINE FLOWPATH

[75] Inventors: Adam N. Pope, Cincinnati; Ming-Fong Hwang, Chester, both of Ohio

[73] Assignee: General Electric Company, Cincinnati, Ohio

[21] Appl. No.: 767,959

[22] Filed: Sep. 30, 1991

[51] Int. Cl.⁵ .............................................. E16J 15/16
[52] U.S. Cl. ...................................... 277/27; 277/53; 277/96.1; 277/173
[58] Field of Search .................... 277/27, 53, 55, 96.1, 277/173, 177

[56] References Cited

U.S. PATENT DOCUMENTS

| | | | |
|---|---|---|---|
| 1,999,094 | 4/1935 | Godron | 277/27 |
| 3,047,299 | 7/1962 | Karsten | 277/173 |
| 3,305,241 | 2/1967 | Hart | 277/27 |
| 3,423,070 | 1/1969 | Corrigan | 253/77 |
| 3,743,303 | 7/1973 | Pope | 277/27 |
| 3,791,657 | 2/1974 | Bilski | 277/53 |
| 3,887,198 | 6/1975 | McClure et al. | 277/27 |
| 4,082,296 | 4/1978 | Stein | 277/96.1 |
| 4,218,066 | 8/1980 | Ackermann | 277/53 |
| 4,406,466 | 9/1983 | Geary, Jr. | 277/96.1 |
| 4,504,069 | 3/1985 | Stenlund | 277/174 |
| 4,513,975 | 4/1985 | Hauser et al. | 277/22 |
| 4,552,368 | 11/1985 | Wallace | 277/27 |
| 4,685,684 | 8/1987 | Ballard | 277/57 |
| 4,832,350 | 5/1989 | Orlowski | 277/53 |
| 4,919,439 | 4/1990 | Williams | 277/27 |
| 5,002,288 | 3/1991 | Morrison et al. | 277/27 |

FOREIGN PATENT DOCUMENTS 0920892 3/1963 United Kingdom ............... 277/96.1

Primary Examiner—William A. Cuchlinski, Jr.
Assistant Examiner—Daniel G. DePumpo
Attorney, Agent, or Firm—Jerome C. Squillaro; John R. Rafter

[57] ABSTRACT

A ring seal having a continuous circumferentially extending and radially facing outside diameter seal dam positioned adjacent the upstream, axially facing, high pressure side of the ring seal. The seal dam is aerodynamically connected to a downstream axially facing, low pressure side of the ring seal by axial vents. A plurality of radially extending upstream face vents on the high pressure side of the ring seal are aerodynamically connected to a corresponding axially facing upstream transverse sealing dam. A plurality of radially extending, downstream face vents on the low pressure side of the ring seal are aerodynamically connected to a corresponding axially facing, downstream transverse sealing dam. The upstream and downstream face vents serve to reduce an axial force exerted against the ring seal and the outside diameter vents which are aerodynamically coupled to the outside diameter seal dams serve to increase a radial force which pushes the ring seal against a stationary outer seat causing the ring seal to maintain a desired fixed position.

11 Claims, 4 Drawing Sheets

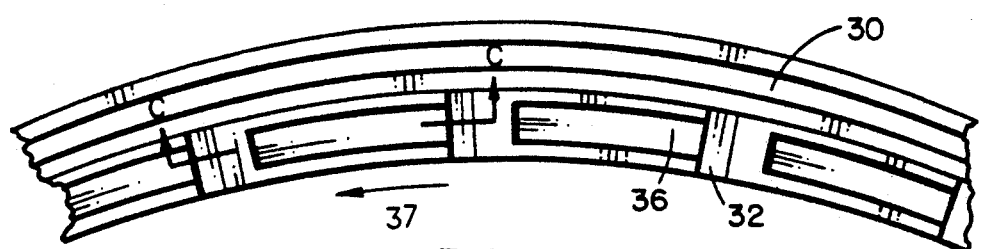
FIG. 6A
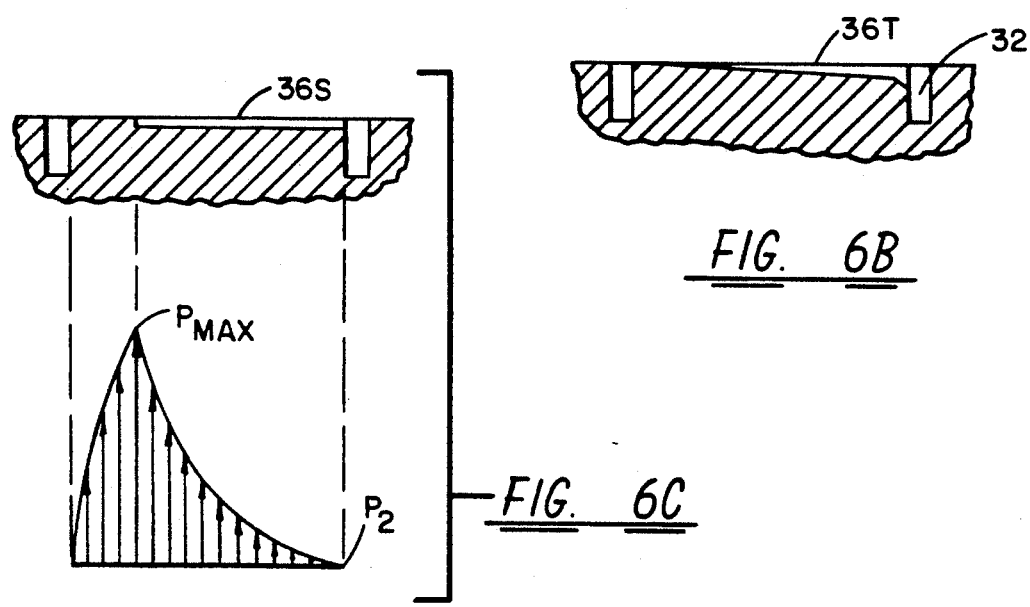
FIG. 6B
FIG. 6C
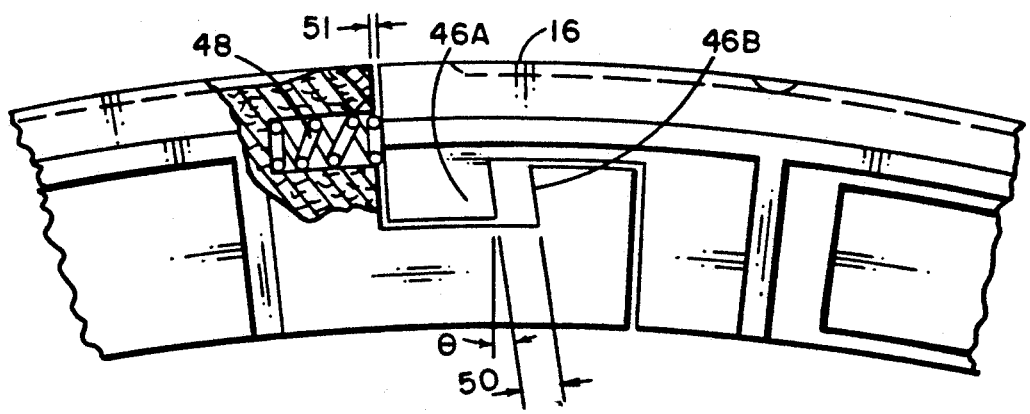
FIG. 7

EFFECTIVE SEALING DEVICE FOR ENGINE FLOWPATH

CROSS-REFERENCES

Reference is made to the following co-pending and related applications having U.S. Ser. No. 07/757,777 and U.S. Ser. No. 07/757,774.

BACKGROUND OF THE INVENTION

The present invention relates to sealing devices adjacent a gas flowpath of a gas turbine engine and, more particularly, to a ring seal having a seal dam on a high pressure side of the ring seal adjacent an outside diameter thereof.

Current gas turbine engine technology uses labyrinth seals to isolate gas flowpaths, reduce circulations, minimize parasitic losses, and maintain cavity pressures to control rotor thrust balance. These seals control the leakage of high pressure gas by throttling it through a series of annular restrictions formed radially between a set of labyrinth "teeth" and rub strips. The teeth and rub strips are pre-machined to provide a fixed radial clearance at engine assembly level. The rub strips are abradable to allow the teeth to rub lightly during dynamic operation thus providing a minimum of clearance.

Wear on the knife edge of the labyrinth teeth and wear on the corresponding rub strip severely limits the ability of labyrinth seals to maintain a small clearance. Some wear is caused by high radial and centrifugal thermal expansions and contractions. In addition, wear results from axial translations and gyroscopic excursions that occur over a range of operating shaft speeds. Wear rate is generally a function of air temperatures, pressure and, in the case of aircraft engines, high G-maneuvers and hard landings.

As a result of this inability to maintain a small clearance, the majority of labyrinth seals leak excessively. The excessive leakage of labyrinth seals located at primary and secondary flowpaths has a detrimental effect on engine efficiency, performance, fuel consumption, and/or turbine blade life.

Thus, a need is seen for a seal mechanism which maintains a small clearance level and is generally impervious to wear caused by the operating conditions of an engine.

SUMMARY OF THE INVENTION

Accordingly, one object of the present invention is to provide a seal which maintains a low effective clearance level at sealing interfaces.

Another object of the present invention is to provide a seal which is easy to assemble and install.

Yet another object of the present invention is to provide a seal which is effective for long periods of use.

These and other valuable objects and advantages of the present invention are provided by a ring seal having an outside diameter seal dam which is positioned adjacent a high pressure side of the ring seal. This seal dam is aerodynamically connected to a low pressure side of the ring seal by a series of axial vents. A plurality of upstream face vents on the high pressure side are aerodynamically connected to a corresponding upstream transverse sealing dam. The upstream transverse face of the ring seal is subjected to an axial force $F_1$ originating from the high pressure fluid. A plurality of downstream face vents on the low pressure side are aerodynamically connected to a corresponding downstream transverse sealing dam. The upstream and downstream face vents serve to reduce an axial force exerted against the ring seal and the outside diameter vents serve to increase a radial force which pushes the ring seal against a stationary outer seat causing the ring seal to maintain a desired fixed position. The present invention is applicable to turbine engines used in military and commercial aircraft, and to marine and industrial engines. In an illustrative embodiment, the outside diameter seal dam is perpendicularly connected to the upstream transverse face sealing dam at the high pressure side. The outside diameter sealing dam frictionally engages a stationary outer seat by being urged against the stationary outer seat by a radial force component ($F_3$). The ring seal is further equipped with a downstream transverse face sealing dam which is perpendicularly connected to the outside diameter of the sealing ring. The downstream transverse face of the sealing ring is subjected to an axial pressure force $F_2$ which is opposite in direction to the axial pressure force $F_1$. The upstream axial face of the ring seal is separated from a rotating gland by a first space, the upstream axial side including the upstream transverse face sealing dam. A downstream axial side of the ring seal is separated from the rotating gland by a second space, the downstream axial side of the ring seal including the downstream transverse face sealing dam 30. The ring seal has a radially inner surface which is separated from the rotating gland by a third space.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIG. 6A is a closeup axial schematic illustration of the downstream side of the seal ring of the present invention;

FIG. 6B is a cross-sectional illustration taken along line C—C of FIG. 6A which shows a tapered hydrodynamic air lifting pad according to one embodiment of the invention;

FIG. 6C is a cross-sectional illustration taken along line C—C of FIG. 6A which shows a stepped hydrodynamic air lifting pad according to another embodiment of the present invention and includes a graph showing where the maximum hydrodynamic pressure occurs; and FIG. 7 is a closeup schematic illustration of the interlocking tab retention hooks of the present invention which connect two 180° segments which comprise the seal ring.

When referring to the drawings, it is understood that like reference numerals designate identical or corresponding parts throughout the respective figures.

DETAILED DESCRIPTION OF THE INVENTION

Figure 1:
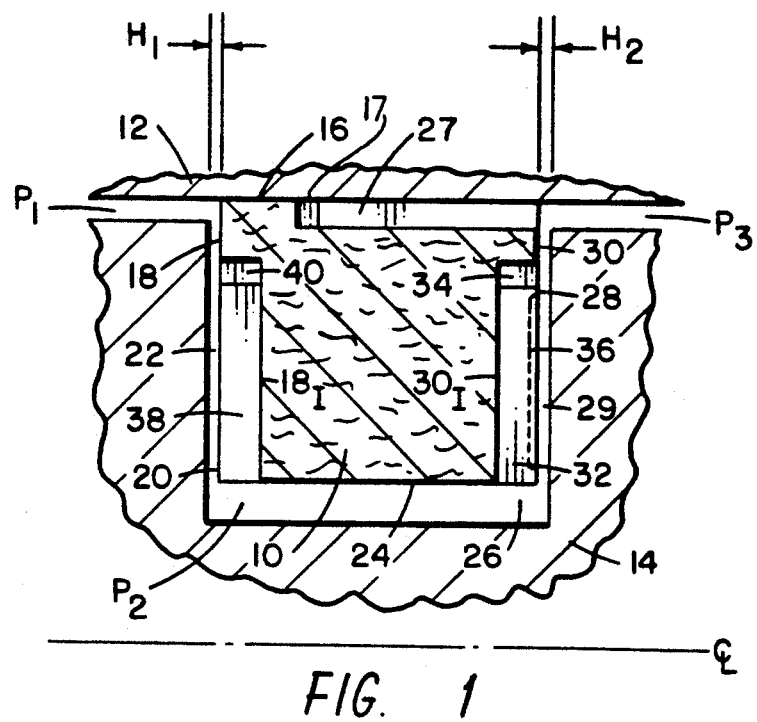
FIG. 1 is a cross-sectional, schematic, radial side-view of a ring seal segment according to the present invention.
Figure 2:
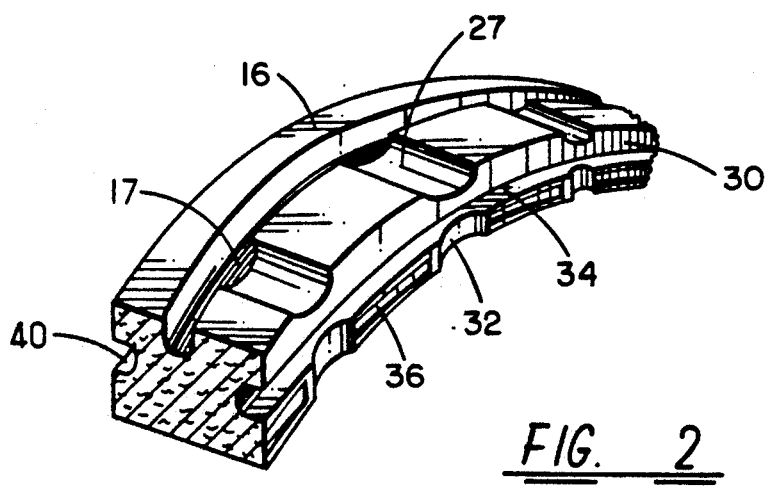
FIG. 2 is a perspective, partial cross-sectional illustration of a portion of a ring seal segment according to the present invention.

Referring to the drawings generally and in particular to FIGS. 1 and 2, a ring seal 10 according to the present invention is frictionally engaged with stationary outer seat 12 which is attached to an engine static frame or other non-rotating member (not shown). The ring seal 10 is located inside a rotating gland 14 which is affixed to a rotating structure (not shown) such as a shaft interconnecting turbine and compressor stages.

An outside diameter (radially outer surface) seal dam 16 frictionally engages a radially inner bore or surface of the stationary outer seat 12 and forms, in combination with a transverse face sealing dam 18 located on the upstream high pressure ($P_1$) side of the ring seal 10, a corner portion of the ring seal 10. An upstream axial surface 20 of the ring seal 10, which includes the transverse face sealing dam 18, is separated from the rotating gland 14 by a first space 22 which has a width $h_1$ which typically measures approximately 0.001 inch. A radially inner surface or bore 24 of ring seal 10 is separated from the rotating gland 14 by a second space 26 which has a radial width of approximately 0.1 inch. Space 26 represents an area of intermediate pressure $P_2$. A downstream axial surface 28 is separated from the rotating gland 14 on a low pressure $P_3$ side of the ring seal 10 by a third space 29 having a width $h_2$ which typically measures 0.001 inch, also. A bore vent 27 aerodynamically connects one side of the outside diameter seal dam 16 with the low pressure side of seal 10.

As will be appreciated from the above recited dimensions of $h_1$ and $h_2$, the gland axial width is only slightly larger than the seal ring axial width. For reasons that will be subsequently explained, the variation in total transverse sealing face clearances at the seal/gland interfaces is very small, with ($h_1+h_2$) being in the range of 0.0005 to 0.0025 inch.

A part of the downstream or low pressure axial surface 28 has an interior surface 30I generally parallel to the axial surface 28 and defines the depth of downstream face vent 32 and downstream circumferential face groove or gap 34, as shown in FIG. 1. However, face vent 32 and face groove 34 may have slightly different depths as shown in FIG. 2. A shallow indentation in the downstream axial surface 28 is represented by hydrodynamic bearing lift pad 36 which abuts downstream face vent 32 and a circumferential groove 34.

The upstream axial surface 20 has an interior edge 18I which lies generally parallel to the upstream axial surface 20 and defines the depth of an upstream face vent 38 and the depth of an upstream circumferential face groove 40.

The outside diameter seal dam 16, the upstream transverse face sealing dam 18, and the downstream transverse face sealing dam 30 are in effect the three primary sealing dams which handle the pressure drops from the high pressure air side $P_1$ to the low pressure air side $P_3$. The ring seal operates on principles similar to floating radial bushings, but operates in an axial direction.

A further appreciation of the invention is afforded by reference to FIG. 2 in which outside diameter seal dam 16 constitutes the outside radial extreme of the ring seal of the present invention. Bore vent 27 extends from transverse face 30 to circumferentially extending face groove 17 which defines the axially facing downstream wall of outside diameter seal dam 16. Hydrodynamic bearing lift pads 6 are located between downstream face vents 32, with vents 32 connecting to face grooves 34.

Figure 3:
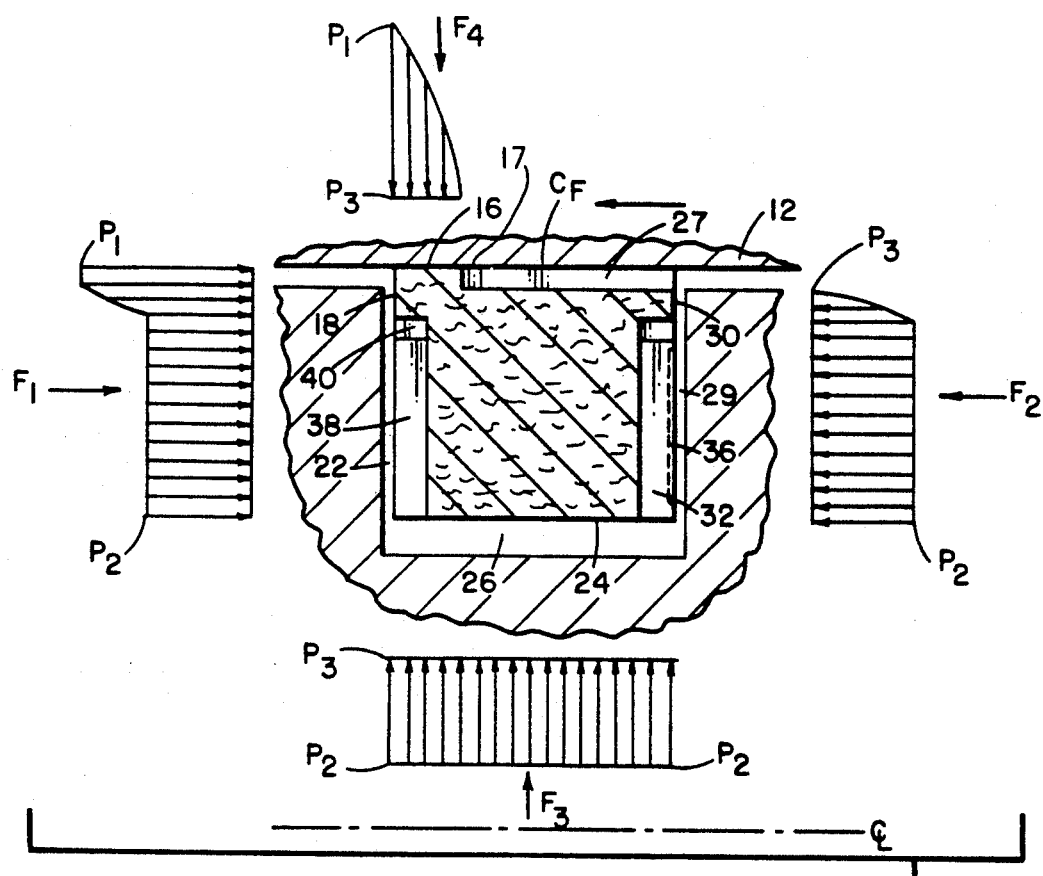
FIG. 3 is similar to FIG. 1 and includes force diagrams which portray the forces which act upon the ring seal of the present invention.

In FIG. 3, the principle forces and pressure profiles acting on the ring seal 10 are represented. $P_1$ represents the upstream high pressure, $P_2$ is an intermediate pressure, and $P_3$ is the downstream low pressure. $F_1$ and $F_2$ are axial forces and $F_3$ and $F_4$ are radial forces. In operation, the high pressure $P_1$ pushes the ring seal toward the low pressure $P_3$ side. The closer the ring seal gets to the rotating gland 14 at the $P_3$ side, the less air flow occurs through spaces 26 and 29, so that $P_2$ approaches $P_1$. The high pressure $P_1$ causes a force $F_3$ to be exerted against the ring seal 10 so that the ring seal pushes against the outer stationary seat 12 where friction inhibits sliding motion. Thus, the seal tends to be self-centering. Furthermore, if the ring seal 10 moves too far toward the $P_3$ side, the rotating gland will push the seal toward the $P_1$ side at the highest arc point (if the gland is cocked or not perpendicular to the center axis of rotation). Also, the hydrodynamic air bearing lift pads 36 will discourage movement toward the $P_3$ side.

Figure 4:
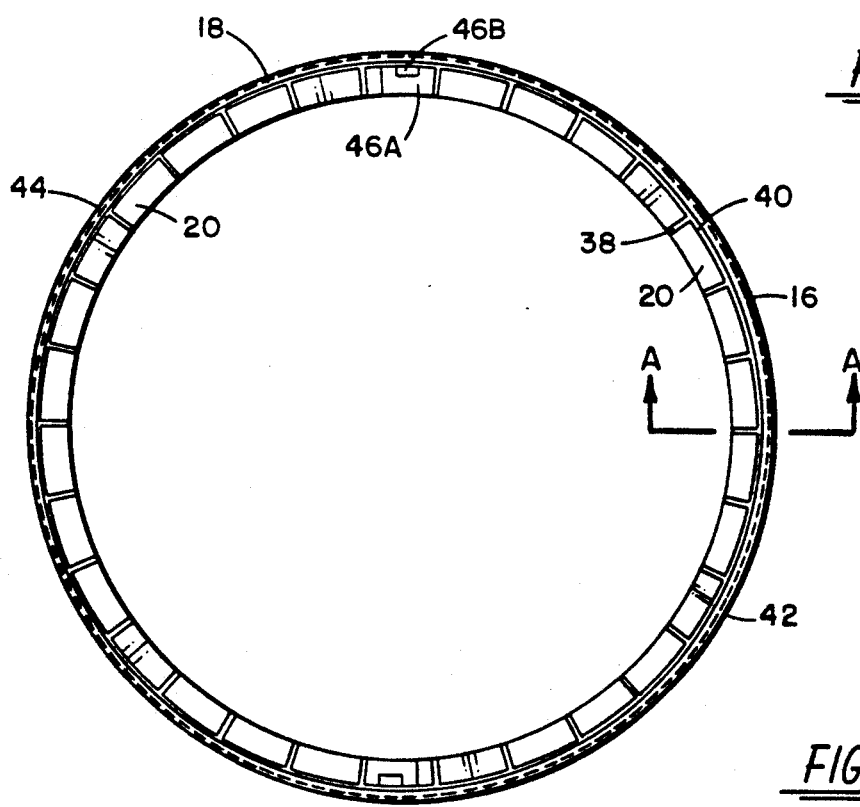
FIG. 4 is an axial schematic illustration of the upstream side of the ring seal of the present invention.

FIG. 4 is an axial view of the upstream side of the ring seal of the present invention. The ring seal is comprised of two 180° segments 42 and 44 which are connected by complementary retention hooks 46A and 46B at each end of the respective segments. The ring seal 10 can be comprised of one contiguous piece having a singular gap similar to an automotive piston ring for radial expansion purposes. However, a segmented ring is preferred for purposes of overcoming overstress problems caused by expanding the ring over the gland outside diameter during assembly.

Upstream face vents or slots 38 (thirty of which are depicted in FIG. 4) make a perpendicular connection with upstream circumferential face groove 40 with the upstream axial surface 20 being located between face vents 38 and radially inward from the upstream circumferential face groove 40. The face vents 38 are approximately 0.1 to 0.115 inches deep. The upstream transverse face sealing dam 18 is located radially outward of circumferential face groove 40.

Figure 5A:
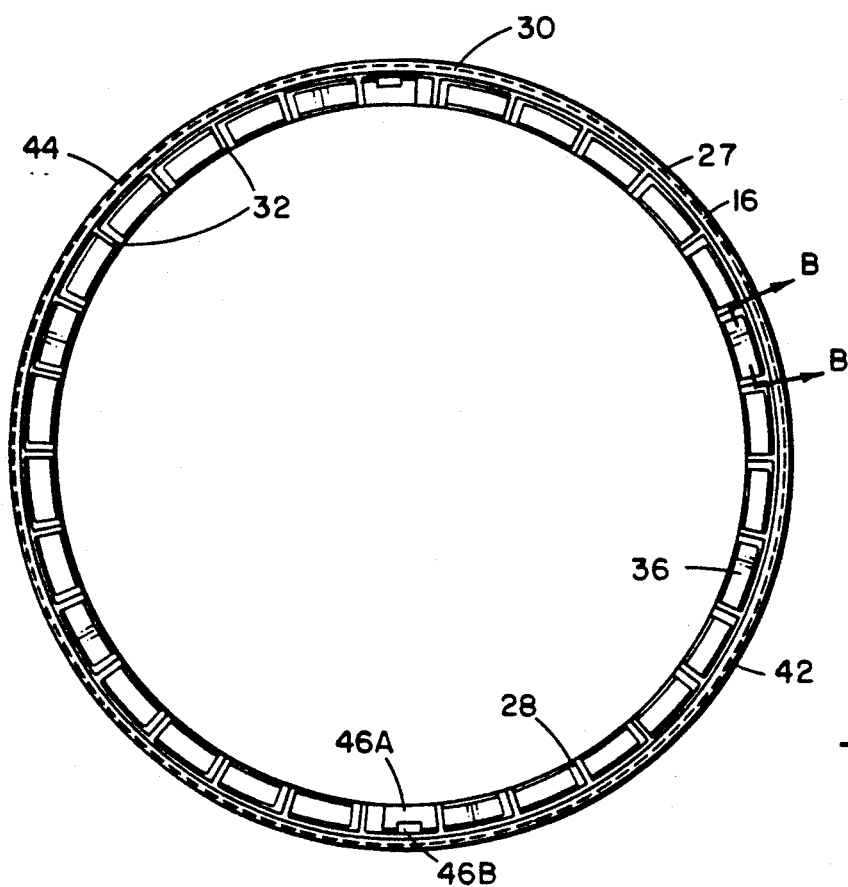
FIG. 5A is an axial schematic illustration of the downstream side of the ring seal of the present invention.
Figure 5B:
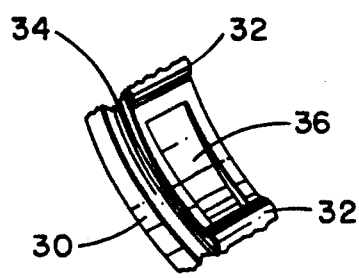
FIG. 5B is an enlarged perspective illustration of a portion of the ring seal of FIG. 5A.

In FIG. 5A, an axial view of the downstream side of the ring seal is depicted. A plurality of hydrostatic bearing lift pads 36 are etched into the downstream axial surfaces 28 (twenty-eight pads are shown) with no pads being present where the segments 42 and 44 are joined by retention hooks 46A and 46B. A plurality of axial face vents or slots is located between the pads (thirty face vents are shown). The vents are approximately 0.100 to 0.115 inches deep. The seal has a uniform radial thickness of approximately 0.35 to 0.65 inches.

The vents are perpendicularly connected to downstream circumferential groove 34. The downstream transverse face sealing dam 30 extends circumferentially around the ring seal 10 and is located radially outward of circumferential face groove 34. A plurality of outside diameter vents 27 are located radially outward of downstream transverse face 30 and extend axially to circumferentially extending face groove 17 which defines the axially facing downstream wall of outside diameter seal dam 16.

In FIG. 6A, hydrodynamic bearing lift pads 36 according to the present invention are etched into the downstream axial surface 28 of the ring seal such that one side of each lift pad connects to a face vent 32. Arrow 37 indicates the direction of gland surface rotation. FIG. 6B illustrates a tapered pad 36T according to one embodiment of the invention while FIG. 6C illustrates a stepped pad 36S according to another embodiment of the invention. FIGS. 6B and 6C are cross-sections taken along line C—C of FIG. 6A. The pressure profile graph of FIG. 6C applies to both the tapered and stepped pads and indicates that the maximum hydrodynamic pressure $P_{max}$ occurs in both the tapered and stepped pads at that side of the pads which do not make contact with a face vent 32.

FIG. 7 depicts how the ends of each 180° segment of the ring seal are joined by tab retention hooks 46A and 46B. In free state, springs 48 push end gap 51 open until gap 50 is zero. Spring force in conjunction with the radially inward force component of angle locks the two segments to prevent disengaging from gland 14. Outside diameter seal dam 6 perpendicular to end gap 51 is larger than bore of radial seat 12 (see FIG. 1). When assembled into bore of 12, ring outside diameter contracts to fit 12 and gap clearance 50 increases while 51 decreases. Circumferential clearance 50 and 51 are selected to accommodate the differential thermal expansion rates of the seal ring and outer seal materials. For seal rings exposed to temperature levels less than 1000° F. the preferred material is carbon graphite. For higher temperatures, a machinable mica glass ceramic (MACOR) or a high temperature (Meehanite) iron is preferably selected as the material for the seal ring.

For the seal to properly function, the ring seal 10 must remain essentially stationary and seated against the outer stationary seat 12 where friction prevents continuous axial sliding and rubbing against the downstream face of the rotating gland 14. Thus, the ring seal 10 is required to be pressure balanced so that the radial force component ($F_r = F_3 - F_4$) multiplied by the coefficient of friction $C_f$ on the stationary outer seat 12 is greater than any axial pressure force component ($F_a = F_1 - F_2$). The relationship $F_a < F_r * C_f$ is required for all pressure levels.

To satisfy this relationship, the ring seal 10 of the present invention has the outside diameter sealing dam 16 located on the upstream high pressure side. By contrast, conventional state of the art seal dams are typically located on the downstream low pressure side. In the present invention, outside diameter vents 27 bleed the low pressure $P_3$ air to the downstream edge of the outside diameter sealing dams 16 which results in a substantial increase in the magnitude of radial pressure seating force $F_r$.

In operation, face vents 32 and 38 bleed the intermediate pressure $P_2$ to the interior edges 30I and 18I of the respective transverse face sealing dams 30 and 18 in order to significantly reduce the net axial pressure force $F_a$. Furthermore, the surface of the radial seat 12 can be given a rough surface for the purpose of achieving a higher coefficient of friction.

Hydrodynamic bearing lift pads 36 can be machined into the downstream axial surfaces 28 to create a stiff gas film which reduces or eliminates the ring-to-gland interface contact loads during axial translation, stator to rotor, where the translation is greater than the clearance. As configured in FIG. 6A, several gas lift pads 36 (three are depicted) are separated in the circumferential direction by very deeply grooved face vents 32. As the shaft rotates, the hydrodynamic rotation of the shaft forces air into spaces in the bearing lift pads 36. The hydrodynamic pressure rise is produced by the shearing gradient at the interface of the very shallow hydrodynamic bearing pockets and the surface of the rotating gland 14 which is connected to the rotating shaft. As has been mentioned, bearing configurations can be tapered-pad 36T (FIG. 6B) or stepped-pad 36S (FIG. 6C) depending upon the load and life requirements.

The advantage of the ring seal of the present invention is that the effective leakage clearance areas at the sealing interfaces can be maintained at an extremely low level, i.e., approximately 0.002 inches or less, regardless of the seal diameter. By comparison, it is generally assumed that a labyrinth seal operates with a radial clearance of 0.001 inches per inch of diameter. Thus, a labyrinth seal having a ten inch diameter would have a radial clearance of 0.010 inches.

Therefore, the present invention can significantly reduce fuel consumption and increase turbine blade life while generally improving overall efficiency/performance of the engine.

The foregoing detailed description is intended to be illustrative and non-limiting. Many changes and modifications are possible in light of the above teachings. Thus, it is understood that the invention may be practiced otherwise than as specifically described herein and still be within the scope of the appended claims.

What is claimed is:

1. A ring seal for use in a gas turbine engine for separating a high pressure fluid on one side of the seal from a low pressure fluid on an opposite side of the seal, said ring seal comprising:
   a) an upstream axially facing side comprising the high pressure side, wherein said upstream axially facing side is subjected to an axial force $F_1$ originating from the high pressure fluid;
   b) a downstream axially facing side comprising the low pressure side, wherein said downstream axially facing side is subjected to an axial force $F_2$ which is opposite in direction to the axial force $F_1$, the axial force $F_2$ originating from the low pressure fluid;
   c) an outer radially facing surface;
   d) an inner radially facing surface comprising an inner bore of said ring seal;
   e) first, second and third circumferentially extending face grooves formed in said upstream axially facing side, said downstream axially facing side and said outer radially facing surface, respectively;
   f) an upstream transverse face sealing dam, wherein said upstream transverse face sealing dam
      (i) comprises a part of said upstream axially facing side, and
      (ii) extends radially from said outer radially facing surface inward to said first circumferentially extending face groove;
   g) a relatively narrow outside diameter bore seal dam which comprises a part of said outer radially facing surface, wherein said outside diameter bore seal dam is
      (i) positioned adjacent the high pressure side of the ring seal,
      (ii) perpendicularly connected to said upstream transverse face sealing dam at said upstream axially facing side for frictionally engaging a stationary outer seat and retarding axial sliding,
      (iii) defined at a downstream end by said third circumferentially extending face groove, and
      (iv) urged against the stationary outer seat by a radially outward pressure force component;

h) a downstream transverse face sealing dam, wherein said downstream transverse face sealing dam
  (i) comprises a part of said downstream axially facing side,
  (ii) is perpendicularly connected to a radially inward extension of said outside diameter bore seal dam, and
  (iii) is defined at a radially inner end by said second circumferentially extending face groove; and
(i) a plurality of upstream face vents which comprise another part of said upstream axially facing side and which extend radially along said upstream axially facing side from said first circumferentially extending face groove to said inner radially facing surface.

2. A ring seal according to claim 1, further comprising:
  a) two circumferentially extending segments positioned in abutting relationship with each of said two circumferentially extending segments including tab retention hooks, wherein each of said tab retention hooks include circumferentially facing ends and an angle $\theta$ formed between each of said circumferentially facing ends and a radial line; and
  b) wherein said two segments are interlocked in free state by
    (i) a spring force exerted by springs located in a circumferential end recess of a first one of said two segments against a second one of said two segments, and
    ii) an appropriate resulting force component direction caused by said angle $\theta$ of said circumferentially facing ends.

3. A ring seal according to claim 1, further comprising a plurality of downstream face vents which comprise another part of said downstream axially facing side and which extend radially along said downstream axially facing side from said second circumferentially extending face groove to said inner radially facing surface.

4. A ring seal according to claim 3, further comprising:
  a) a plurality of hydrodynamic land areas each spaced between adjacent ones of said downstream face vents; and
  b) wherein each of said hydrodynamic land areas is connected at one circumferentially facing end to one of said downstream face vents.

5. A ring seal according to claim 4, wherein each of said hydrodynamic land areas includes an axially extending depth, wherein said depth is tapered in a circumferentially extending direction.

6. A ring seal according to claim 4, wherein each of said hydrodynamic land areas includes an axially extending depth, wherein said depth comprises a stepped configuration in a circumferentially extending direction.

7. A ring seal according to claim 3, wherein:
  a) said upstream axially facing side of said ring seal is separated from a rotating gland by a first space; and
  b) said downstream axially facing side of said ring seal is separated from the rotating gland by a second space.

8. A ring seal according to claim 7 wherein said inner radially facing surface is separated from the rotating gland by a third space.

9. A ring seal according to claim 8, wherein:
  a) each of said plurality of upstream face vents borders said first space and said third space; and
  b) each of said plurality of downstream face vents borders said second space and said third space.

10. A ring seal according to claim 9, wherein said ring seal further comprises:
  a) a plurality of bore vents circumferentially spaced about said ring seal, wherein said plurality of bore vents are defined by said bore seal dam and said downstream transverse face sealing dam; and
  b) wherein each of said upstream face vents and each of said downstream face vents bleed air from the third space causing a reduction in a net axial pressure force $F_2$, wherein each of said bore vents bleed air from the low pressure side causing an increase in said radial force component exerted against the stationary outer seat.

11. A ring seal for providing a generally non-rubbing interface between the seal and a relatively rotating element having a gland for receiving the seal, and for generally isolating a high pressure fluid zone on one side of the seal from a low pressure fluid zone on an opposite side of the seal, said seal comprising:
  a) an outer radially facing surface having a relatively narrow outside diameter (O.D.) bore seal dam formed along an edge thereof and extending about the circumference of said seal, an O.D. groove extending circumferentially about said seal adjacent said seal dam and a plurality of O.D. vents circumferentially spaced about said seal and extending between said groove and the low pressure side of said seal;
  b) an upstream axially facing side proximate said high pressure fluid zone and having a relatively narrow face seal dam extending circumferentially about said seal and having a radially outer edge terminating at a juncture with said O.D. seal dam, a face groove extending circumferentially about said seal and adjacent said face seal dam, a plurality of face vents extending from said face groove to an inner radially facing surface comprising an inner bore of said seal;
  c) a downstream axially facing side proximate said low pressure fluid zone and having a relatively narrow face seal land extending circumferentially about said seal and having another face groove extending circumferentially and adjacent said face seal land, another plurality of face vents extending from said another face groove to said inner radially facing surface of said seal, and a plurality of hydrodynamic land areas each spaced between adjacent ones of said another plurality of face vents; and
  d) said seal being aerodynamically centered in the gland by relative rotation between said downstream axially facing side of the seal and the adjacent surface of the gland from hydrodynamic reaction on said hydrodynamic land areas and wherein a radially outward pressure exerted on said seal from fluid pressure in the gland creates a high friction interaction on said outer radially facing surface of said seal whereby axial sliding is retarded.

* * * * *